US012681321B2

(12) United States Patent
Lo et al.

(10) Patent No.: US 12,681,321 B2
(45) Date of Patent: Jul. 14, 2026

(54) OPTICAL ELEMENT DRIVING MECHANISM

(71) Applicant: Actutek Corporation, Taoyuan City (TW)

(72) Inventors: Yu-Chiao Lo, Taoyuan City (TW); Hsiao-Hsin Hu, Taoyuan City (TW); Chih-Wen Chiang, Taoyuan City (TW); Chia-Che Wu, Taoyuan City (TW); Mao-Gen Jian, Taoyuan City (TW); Yi-Ho Chen, Taoyuan City (TW); Chao-Chang Hu, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 359 days.

(21) Appl. No.: 18/351,732

(22) Filed: Jul. 13, 2023

(65) Prior Publication Data

US 2024/0019658 A1     Jan. 18, 2024

Related U.S. Application Data

(60) Provisional application No. 63/388,793, filed on Jul. 13, 2022.

(51) Int. Cl.
G02B 27/64          (2006.01)
G02B 7/02          (2021.01)
(Continued)

(52) U.S. Cl.
CPC ............. G02B 27/646 (2013.01); G02B 7/02 (2013.01); G02B 27/01 (2013.01);
(Continued)

(58) Field of Classification Search
CPC . G03B 9/06; G03B 5/00; G03B 17/12; G03B 30/00; G03B 2205/0069; G03B 3/10; G03B 13/36; G03B 2205/0023; G03B 5/02; G03B 17/17; G03B 2205/0007; G03B 2205/0015; G03B 2205/0046; G03B 5/04; G03B 9/04; G03B 9/10; G03B 9/14; G02B 7/02; G02B 27/646; G02B 2027/0159; G02B 7/04; G02B 7/08; G02B 27/0172; G02B 27/0176; G02B 27/0149; G02B 7/00; G02B 27/00; G02B 27/01; G02B 27/30; G02B 27/62; G02B 7/102; G02B 13/0015;
(Continued)

(56) References Cited

U.S. PATENT DOCUMENTS

2011/0103782 A1* 5/2011 Tsuruta .................. H04N 23/55
                                                 359/557
2012/0314307 A1* 12/2012 Ikushima ................. G02B 7/08
                                                 359/814
(Continued)

*Primary Examiner* — Matthew Y Lee
(74) *Attorney, Agent, or Firm* — MUNCY, GEISSLER, OLDS & LOWE, P.C.

(57) ABSTRACT

An optical element driving mechanism is provided. The optical element driving mechanism includes a movable part, a fixed part, a driving assembly, and a pressure assembly. The movable part connects an optical element. The movable part moves relative to the fixed part. The driving assembly drives the movable part to move relative to the fixed part, and the pressure assembly exerts a first pre-pressure onto the movable part.

18 Claims, 8 Drawing Sheets

1

(51) Int. Cl.

| | |
|---|---|
| *G02B 27/01* | (2006.01) |
| *G03B 5/00* | (2021.01) |
| *G03B 17/12* | (2021.01) |
| *H02K 41/035* | (2006.01) |

(52) U.S. Cl.
CPC ..... *G02B 27/0172* (2013.01); *G02B 27/0176* (2013.01); *G03B 5/00* (2013.01); *G03B 17/12* (2013.01); *H02K 41/0354* (2013.01); *G02B 2027/0159* (2013.01); *G03B 2205/0069* (2013.01)

(58) Field of Classification Search
CPC .............. G02B 13/004; G02B 13/0045; G02B 13/0065; G02B 13/0075; G02B 13/009; G02B 26/004; G02B 26/0816; G02B 26/0883; G02B 27/0068; G02B 27/0955; G02B 27/0972; G02B 27/0977; G02B 3/04; G02B 3/12; G02B 3/14; G02B 5/003; G02B 5/005; G02B 6/0025; G02B 6/0066; G02B 7/021; G02B 7/023; G02B 7/09; G02B 7/10; G02B 7/1805; G02B 7/182; G02B 7/1821; G02B 7/1828; G02B 9/04; G02B 9/62; G02B 13/00; G02B 27/64; H02K 41/0354; H02K 41/0356; F03G 7/0614; F03G 7/06143; F03G 7/06145; H04N 23/54

See application file for complete search history.

(56) References Cited

U.S. PATENT DOCUMENTS

| | | | | |
|---|---|---|---|---|
| 2016/0170227 | A1* | 6/2016 | Minamisawa ......... | H04N 23/57 |
| | | | | 359/557 |
| 2016/0255276 | A1* | 9/2016 | Sekimoto ................. | G02B 7/09 |
| | | | | 29/428 |
| 2018/0059381 | A1* | 3/2018 | Sharma .................... | G02B 7/08 |
| 2019/0227405 | A1* | 7/2019 | Song ................... | F03G 7/06143 |
| 2023/0023813 | A1* | 1/2023 | Oh ......................... | H04N 23/54 |

* cited by examiner

1

OPTICAL ELEMENT DRIVING MECHANISM

CROSS REFERENCE TO RELATED APPLICATIONS

This application claims the benefit of U.S. Provisional Application No. 63/388,793, filed 13 Jul. 2022, the entirety of which is incorporated by reference herein.

BACKGROUND OF THE INVENTION

Field of the Invention

The present invention relates to an optical element driving mechanism and, in particular, to an optical element driving mechanism with a pressure assembly that exerts a pre-pressure onto the movable part.

Description of the Related Art

Thanks to developments in science and technology, many electronic devices (such as notebook computers, smartphones, and digital cameras) now have the function of taking photos and recording videos. The use of these electronic devices is becoming more and more common. Apart from the development of more stable and better optical quality, the design is also moving towards these devices being more convenient and thinner, so as to provide users with more choice. The design of electronic devices is constantly developing towards miniaturization, meaning that the size of various assemblies and structures used in optical modules such as cameras must also be continuously reduced. In view of this, how to design a miniaturized driving mechanism has become an important issue.

BRIEF SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate parts of the entire specification of this disclosure, any or all drawings, and each claim.

According to certain aspects of the present disclosure, an optical element driving mechanism is provided. The optical element driving mechanism includes a movable part, a fixed part, a driving assembly, and a pressure assembly. The movable part connects an optical element. The movable part moves relative to the fixed part. The driving assembly drives the movable part to move relative to the fixed part. The pressure assembly is used to exert a first pre-pressure onto the movable part.

In some embodiments, the pressure assembly has a plate structure.

In some embodiments, the pressure assembly further includes a corresponding part of the movable part, a corresponding part of the fixed part, and an elastic part. The corresponding part of the movable part corresponds to the movable part. The corresponding part of the fixed part corresponds to the fixed part. The corresponding part of the movable part is movably connected to the corresponding part of the fixed part via the elastic part. The first surface and the second surface are located at the corresponding part of the movable part.

In some embodiments, the corresponding part of the movable part includes a first surface and a second surface. The first surface is a surface of the corresponding part of the movable part facing the movable part. The second surface is a surface of the corresponding part of the movable part facing the fixed part. When viewed along the direction of the thickness of the pressure assembly, the first surface and the second surface at least partially overlap.

In some embodiments, the movable part moves within a limit range relative to the fixed part. The limit range includes a first range, and the driving assembly drives the movable part to move relative to the fixed part in the first range.

In some embodiments, the central value of the limit range is different from the central value of the first range.

In some embodiments, the optical element driving mechanism further includes a control assembly, the control assembly causes the movable part to move relative to the fixed part within a control range.

In some embodiments, the first range includes the control range. When the movable part is located within the control range, the pressure assembly does not exert the first pre-pressure onto the movable part, and the pressure assembly does not contact the movable part.

In some embodiments, in the direction of the thickness of the pressure assembly, when the movable part moves within the control range, the distance between the corresponding part of the movable part and the corresponding part of the fixed part does not change.

In some embodiments, the central value of the control range is different from the central value of the limit range. The limit range further includes a middle range, which is a section in the middle of seven sections into which the limit range is equally divided. The central value of the control range and the central value of the first range are not located within the middle range.

In some embodiments, the driving assembly has a magnetic element and a coil. The magnetic element and the coil have approximately the same size, the driving assembly drives the movable part to move relative to the fixed part in a first range.

In some embodiments, when the movable part is located at the bottom end of the first range, the movable part is in contact with the pressure assembly, the movable part directly contacts the first surface. When the movable part is located at the bottom end of the first range, the corresponding part of the movable part is on the same plane as the corresponding part of the fixed part. When the movable part is located at the bottom end of the first range, the corresponding part of the movable part does not contact the fixed part.

In some other embodiments, the driving assembly has a magnetic element and a coil. The size of the magnetic element is larger than the coil, the driving assembly drives the movable part to move relative to the fixed part in a first range.

In some other embodiments, when the movable part is located at the bottom end of the first range, the movable part is in contact with the pressure assembly, the movable part directly contacts the first surface. When the movable part is located at the bottom end of the first range, when viewed along a direction perpendicular to the direction of the thickness of the pressure assembly, the corresponding part of the fixed part at least partially overlaps the movable part. When the movable part is located at the bottom end of the first range, the corresponding part of the movable part directly contacts the fixed part, and the second surface directly contacts the fixed part.

In some other embodiments, the driving assembly has a magnetic element and a coil. The size of the magnetic element is larger than the coil, the driving assembly drives the movable part to move relative to the fixed part in a first range.

In some other embodiments, when the movable part is located at the bottom end of the first range, the movable part is in contact with the pressure assembly, the movable part directly contacts the first surface. When the movable part is located at the bottom end of the first range, when viewed along a direction perpendicular to the direction of the thickness of the pressure assembly, the corresponding part of the fixed part at least partially overlaps the movable part. When the movable part is located at the bottom end of the first range, the corresponding part of the movable part does not contact the fixed part.

In some embodiments, the movable part corresponds to an external assembly, and the external assembly exerts a second pre-pressure onto the movable part, the second pre-pressure puts the movable part to the bottom end of a first range.

In some embodiments, the first pre-pressure and the second pre-pressure are in different directions.

In some embodiments, when the movable part is located at the bottom end of the first range, the movable part is in contact with the pressure assembly.

In some embodiments, when the movable part is located at the bottom end of the first range, the corresponding part of the fixed part at least partially overlaps the movable part when viewed along a direction perpendicular to the direction of the thickness of the pressure assembly. When the movable part is located at the bottom end of the first range, the corresponding part of the movable part does not contact the fixed part.

In some other embodiments, when the movable part is located at the bottom end of the first range, the corresponding part of the fixed part at least partially overlaps the movable part when viewed along a direction perpendicular to the direction of the thickness of the pressure assembly. When the movable part is located at the bottom end of the first range, the corresponding part of the movable part directly contacts the fixed part.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

Figure 1:
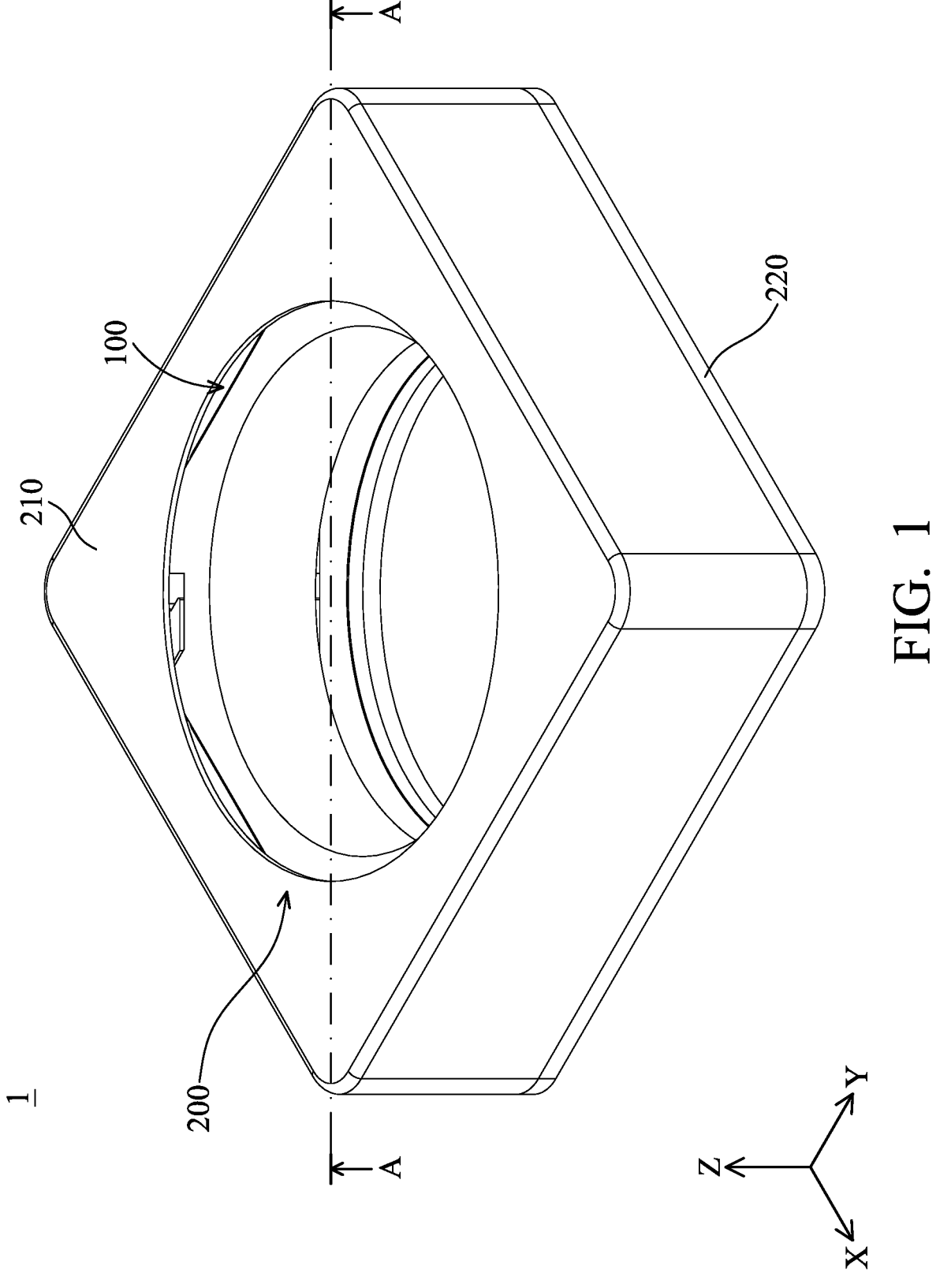

FIG. 1 is a front perspective view of an exemplary optical element driving mechanism, according to certain aspects of the present disclosure.

Figure 2:

FIG. 2 is an exploded perspective view of the optical element driving mechanism of FIG. 1, according to certain aspects of the present disclosure.

Figure 3:
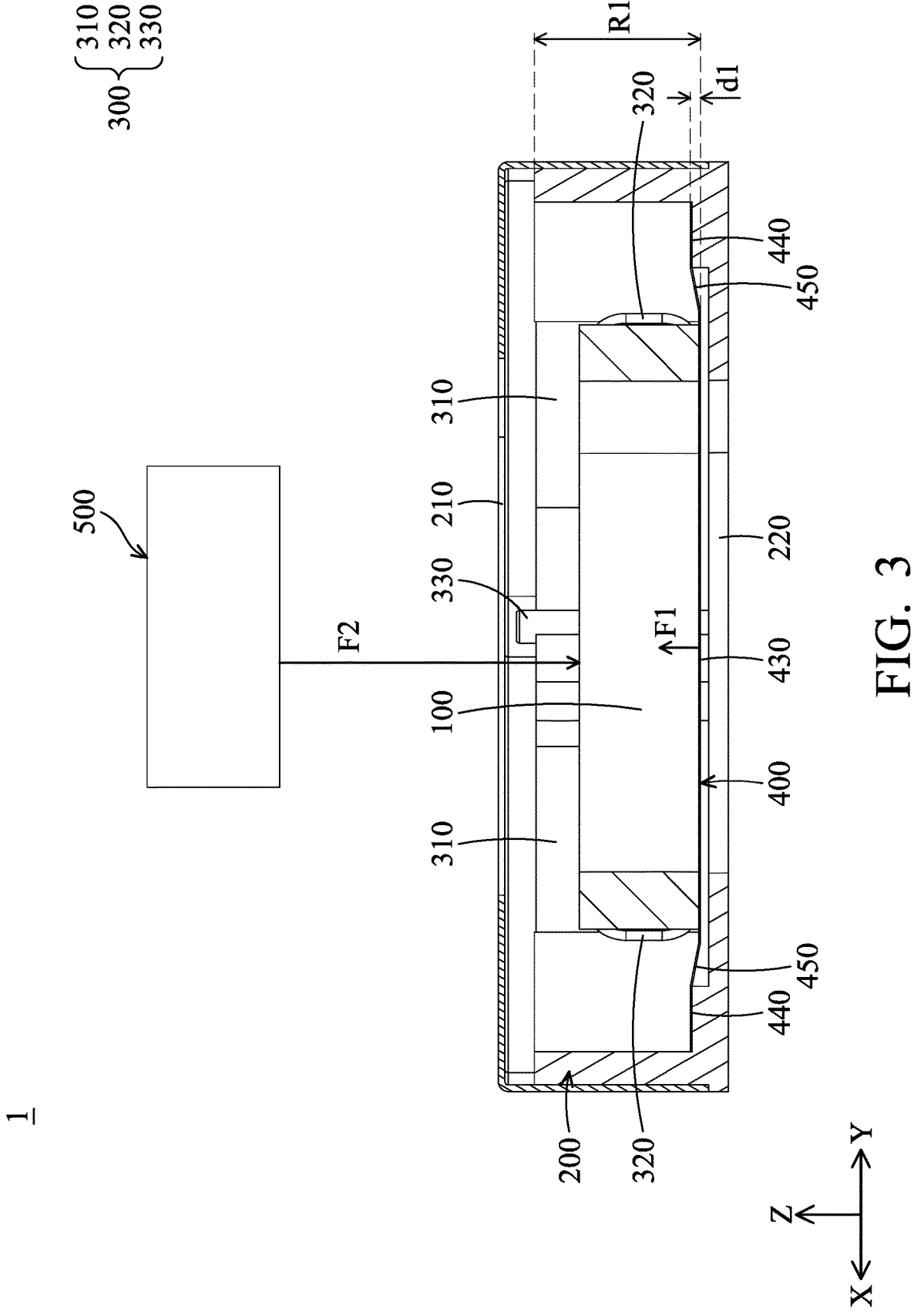

FIG. 3 is a cross-sectional view of the optical element driving mechanism along line A-A of FIG. 1 when the movable part is located in a first position, according to certain aspects of the present disclosure.

Figure 4:
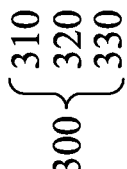
Figure 4:
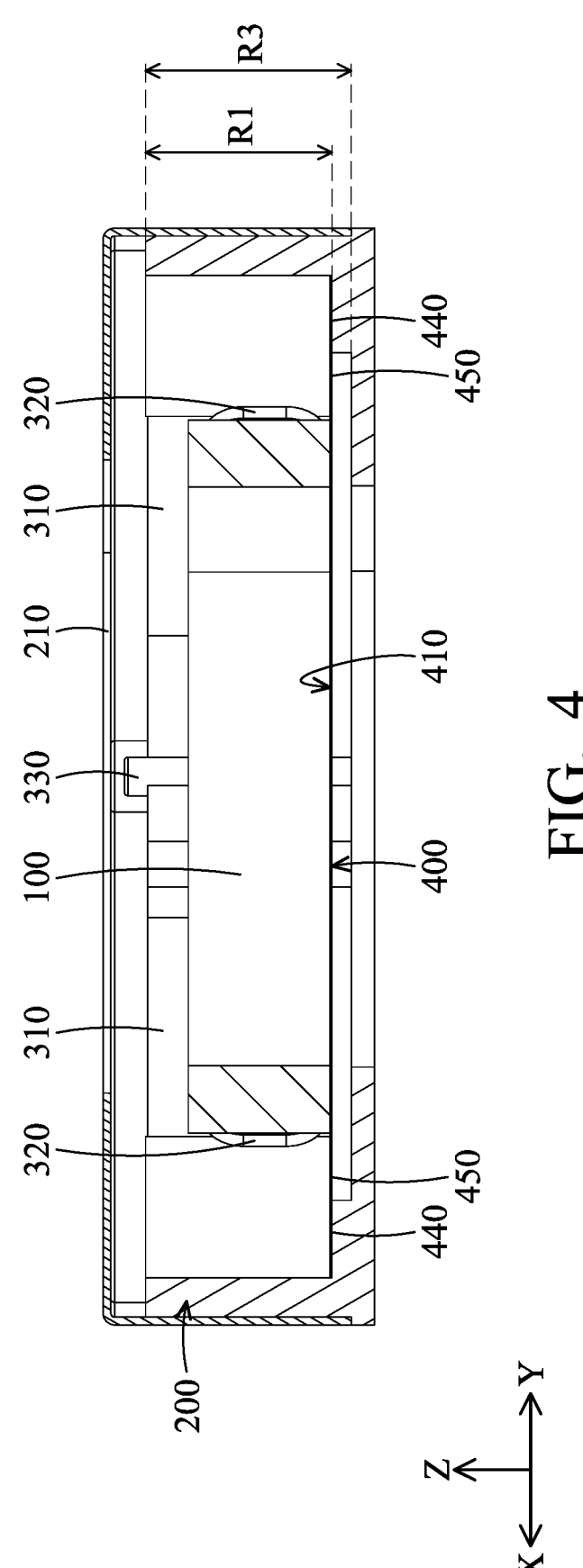

FIG. 4 is a cross-sectional view of the optical element driving mechanism along line A-A of FIG. 1 when the external assembly is removed and the movable part is located at an initial position, according to certain aspects of the present disclosure.

Figure 5:
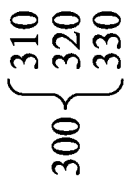
Figure 5:
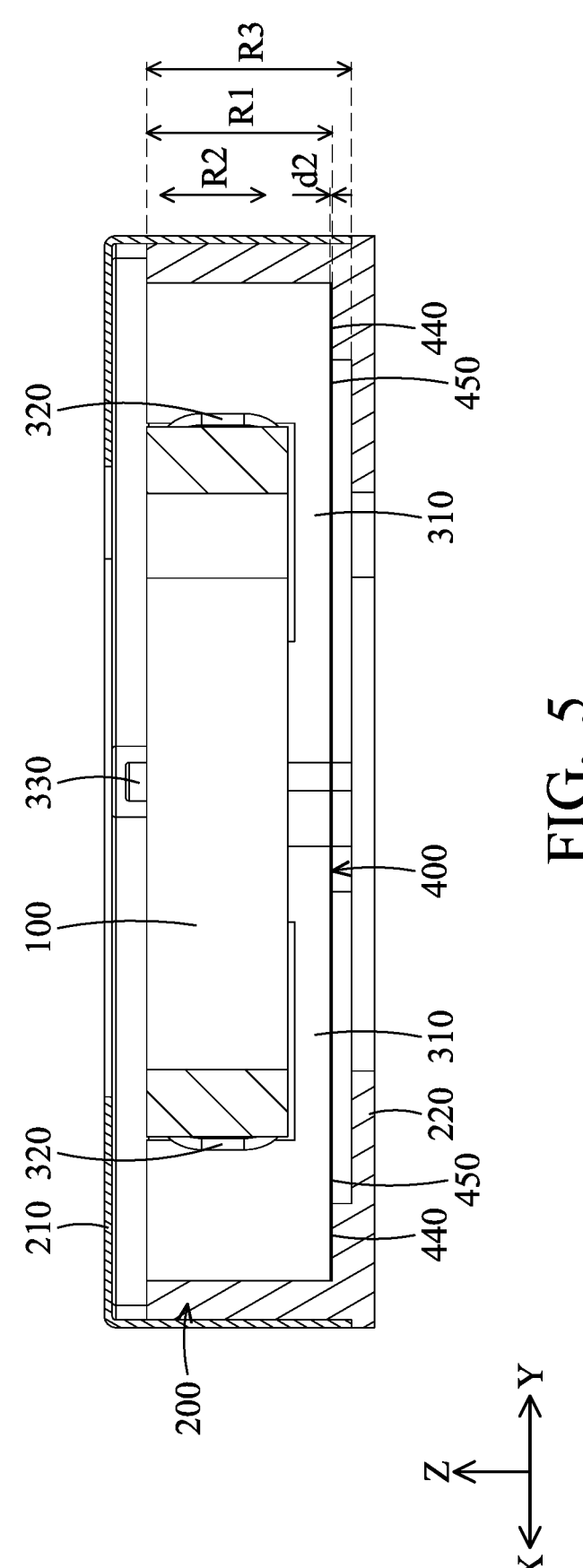

FIG. 5 is a cross-sectional view of the optical element driving mechanism along line A-A of FIG. 1 when the movable part is located at the top end of the first range, according to certain aspects of the present disclosure.

Figure 6:
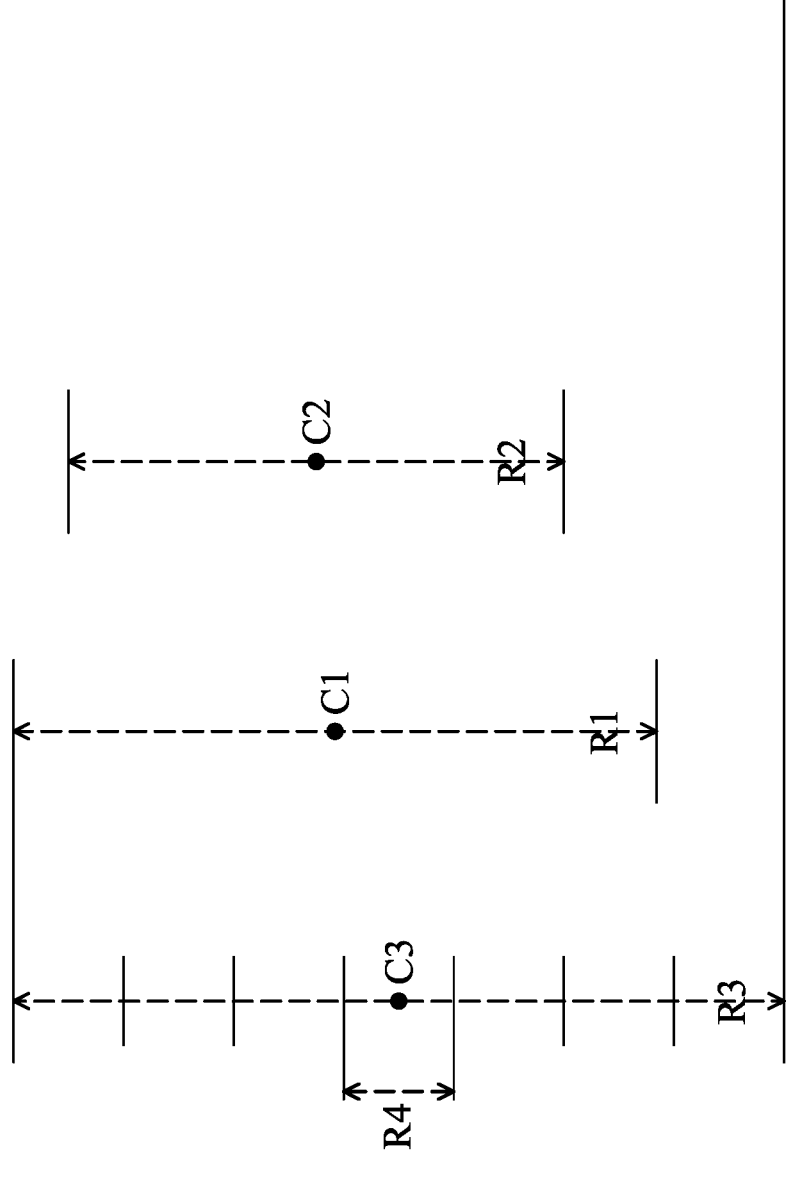

FIG. 6 is a schematic diagram of the first range, the control range, the limit range of the optical element driving mechanism, and a middle range of the limit range, according to certain aspects of the present disclosure.

Figure 7:
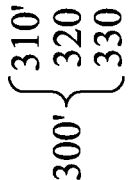
Figure 7:
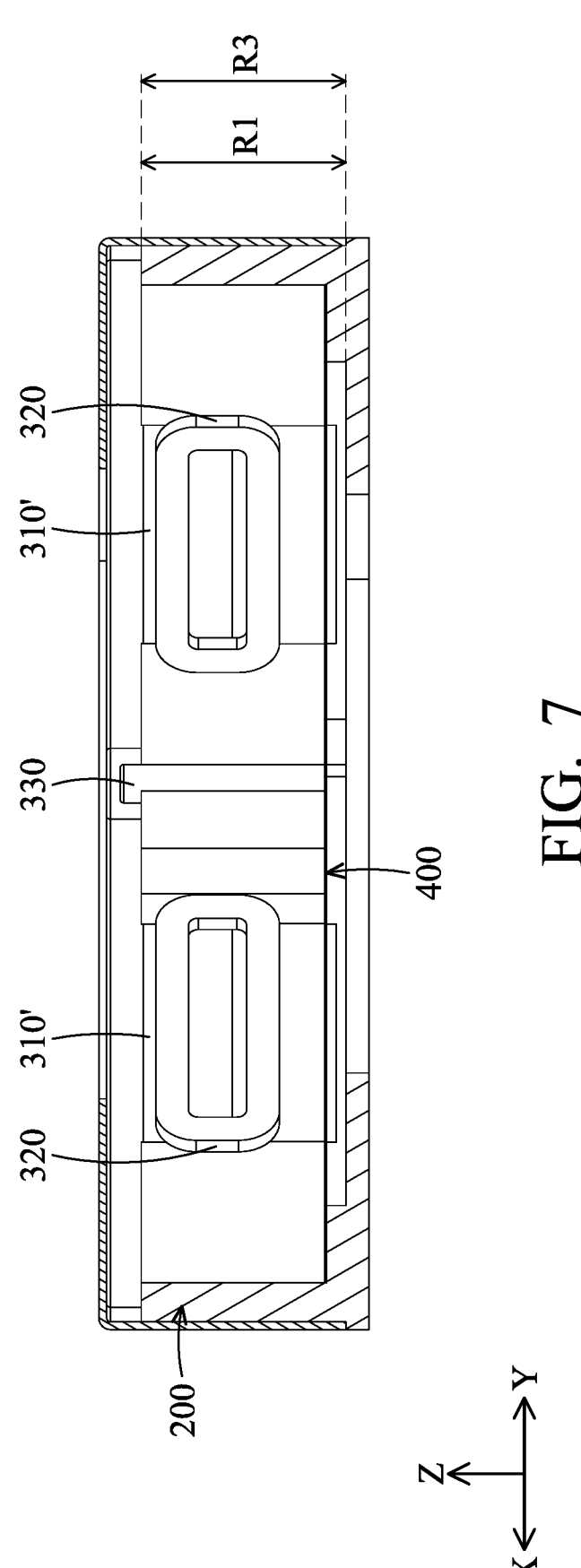

FIG. 7 is a cross-sectional view of another example of an optical element driving mechanism with the movable part not shown for illustrative reasons, according to certain aspects of the present disclosure.

Figure 8:
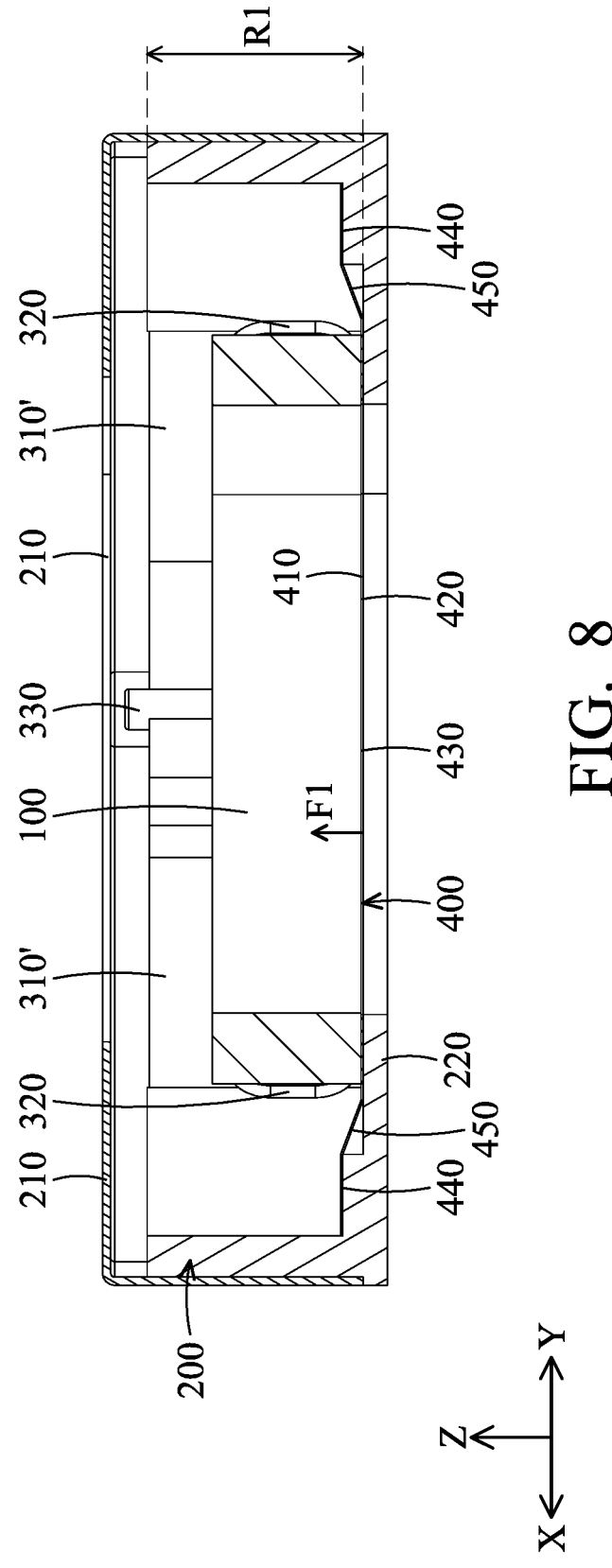

FIG. 8 is a cross-sectional view of another example of an optical element driving mechanism when the movable part is located at the initial position, according to certain aspects of the present disclosure.

DETAILED DESCRIPTION OF THE INVENTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

First, please refer to FIG. 1 and FIG. 2. FIG. 1 is a front perspective view of an exemplary optical element driving mechanism 1, according to certain aspects of the present disclosure. The optical element driving mechanism 1 is connected with an optical element (not shown). FIG. 2 is an exploded perspective view of the optical element driving mechanism 1, according to certain aspects of the present disclosure. The optical element driving mechanism 1 includes a movable part 100, a fixed part 200, a driving assembly 300, a pressure assembly 400, an external assembly 500, and a control assembly 600. The movable part 100 accommodates an optical element (not shown). The movable part 100 may move relative to the fixed part 200 within the limit range R3 (see FIG. 4 and FIG. 5). The driving assembly 300 is for driving the movable part 100 to move relative to the fixed part 200. The pressure assembly 400 exerts a first pre-pressure F1 (see FIG. 3) onto the movable part 100 when the pressure assembly 400 is deformed. The movable part 100 corresponds to the external assembly 500. The external assembly 500 exerts a second pre-pressure F2 onto the movable part 100 (see FIG. 3), and the directions of the first pre-pressure F1 and the second pre-pressure F2 are different. The movable part 100 may be driven by the driving assembly 300, and the external assembly 500 exerts the second pre-pressure F2 to move within a first range R1. The control assembly 600 is electrically connected to the driving assembly 300 to control the range of movement of the movable part 100.

The fixed part 200 includes a housing 210 and a bottom 220. The housing 210 is fixedly connected to the bottom 220.

The driving assembly 300 includes several magnetic elements 310, several coils 320, and several guiding elements 330. In this example, the driving assembly 300 of the optical driving mechanism 1 includes four magnetic elements 310, four coils 320, and two guiding elements 330. The magnetic elements 310 and the guiding elements 330 are disposed on the bottom 220 of the fixed part 200. The movable part 100 has two grooves 110 and four protrusions 120. The guiding elements 330 pass through the grooves 110, and pass through grooves 222 of the bottom 220, the grooves 110 and the grooves 222 secure the guiding elements 330, making the movable part 100 moves along the guiding element 330 relative to the fixed part 200. The coils 320 are disposed on the movable part 100 and fixed to the protrusions 120. By the electromagnetic driving force generated between the magnetic elements 310 and the coils 320, the coils 320 move relative to the magnetic element 310 to drive the moving part 100 to move in the Z-axis direction. The guiding elements 330 guide the movement of the movable part 100. In the optical drive mechanism 1 of this example, the magnetic element 310 has a smaller size, for example, the magnetic elements 310 has approximately the same size as the coils 320, but in another example of the optical drive mechanism 2 (see FIG. 8), the magnetic elements may have larger dimensions. Details of the optical drive mechanism 2 is described below with respect to FIG. 8.

The pressure assembly 400 has a plate structure and is made of flexible materials (e.g., springs, reeds, etc.). The pressure assembly 400 includes a corresponding part of the movable part 430, a corresponding part of the fixed part 440, and an elastic part 450. The corresponding part of the movable part 430 is movably connected to the corresponding part of the fixed part 440 via the elastic part 450. The corresponding part of the fixed part 440 is fixedly connected to the bottom 220 of the fixed part 200. The corresponding part of the movable part 430 includes a first surface 410 and a second surface 420 (see FIG. 6). The first surface 410 is a surface of the corresponding part of the movable part 430 facing the movable part 100, and the second surface 420 is a surface of the corresponding part of the movable part 430 facing the bottom 220. That is, the first surface 410 and the second surface 420 are located on the corresponding part of the movable part 430. The plate structure and flexibility of the pressure assembly 400 increases the stability of the optical driving mechanism 1 and saves its internal space, as will be explained below.

Please refer to FIG. 3, which is a cross-sectional view of the optical element driving mechanism 1 along the line A-A of FIG. 1 when the movable part 100 is in a first position, according to certain aspects of the present disclosure. The external assembly 500 may be, for example, a dust cover, a shutter, an outer cover, etc. When the optical element driving mechanism 1 is in an unused state, the external assembly 500 exerts a second pre-pressure F2 onto the movable part 100, so that the movable part 100 is located in the first position at the bottom end of the first range R1, and the movable part 100 is not in contact with the fixed part 200. The second pre-pressure F2 applied by the external assembly 500 deforms the elastic part 450 of the pressure assembly 400, and thus exerts the first pre-pressure F1 (e.g., a spring restoring force) onto the movable part 100. In the direction of the thickness of the pressure assembly 400 (Z-axis direction), the corresponding part of the movable part 430 is separated from the corresponding part of the fixed part 440 by a first distance d1. When the movable part 100 is in the first position, the movable part 100 is in contact with the pressure assembly 400. When viewed along the direction perpendicular to the direction of the thickness of the pressure assembly 400 (X-axis or Y-axis direction), the corresponding part of the fixed part 440 and the movable part 100 at least partially overlap. The pressure assembly 400 enables the movable part 100 to have a relatively stable support when receiving the second pre-pressure F2 from the external assembly 500, and is not easy to tilt or collide, and utilizes the internal space of the optical element driving mechanism 1. The pressure assembly 400 deforms in the direction to the inside of the optical element driving mechanism 1, which saves the space of the optical element driving mechanism 1 in the Z-axis direction. In the optical element driving mechanism 1 of this example, the corresponding part of the movable part 430 does not contact the fixed part 200. However, in other exemplary optical element driving mechanisms, the corresponding part of the movable part may directly contact the fixed part.

Next, please refer to FIG. 4, which shows a cross-sectional view of the optical element driving mechanism 1 along line A-A in FIG. 1 when the external assembly 500 is removed (that is, the second pre-pressure F2 is removed) and the movable part 100 is located in an initial position at the bottom end of the first range R1, according to certain aspects of the present disclosure. It should be understood that the first range R1 referred to in FIG. 4 is different from the first range R1 referred to in FIG. 3, because in FIG. 4, the second pre-pressure F2 has been removed, but for the convenience of illustration, the range of motion of the movable part 100 is referred to as the first range R1.

When the optical element driving mechanism 1 is in use, the external assembly 500 is removed (for example, the dust cover is removed, the shutter is opened, and the outer cover is opened, etc. during use). When the external assembly 500 is removed, so the second pre-pressure F2 is not applied to the movable part 100, the movable part 100 may be driven by the driving assembly 300 to move relative to the fixed part 200 within the first range R1. By the electromagnetic driving force generated between the magnetic elements 310 and the coils 320, the coils 320 move relative to the magnetic elements 310 and drive the moving part 100 to move in the Z-axis direction, and the movement is guided by the guiding elements 330. In this example of optical element driving mechanism 1, the movable part 100 may be driven by the driving assembly 300 to move relative to the fixed part 200 within a first range R1. When the movable part 100 in located at any position within the first range R1, the pressure assembly 400 does not apply the first pre-pressure F1 to the movable part 100. When the movable part 100 is located at the initial position at the bottom end of the first range R1, the movable part 100 is in contact with the pressure assembly 400, the movable part 100 directly contacts the first surface 410. The corresponding part of the movable part 430 is located at the same plane with the corresponding part 440 of the fixed part. The movable part corresponding part 430 does not contact the fixed part 200.

Please refer to FIG. 5. FIG. 5 is a cross-sectional view of the optical element driving mechanism 1 along line A-A of FIG. 1 when the movable part 100 is located at the top end of the first range R1, according to some aspects of the present disclosure. When the user uses the optical element driving mechanism 1 (such as taking a photograph, etc.), he may control the movable part 100 within the control range R2 by using the control assembly 600 (see FIG. 2) that is electrically connected to the coils 320 of the driving assembly 300. That is, the user may move the movable part 100 relative to the fixed part 200 within the control range R2. The control range R2 is located within the first range R1, and the distance from the top end to the bottom end of the control range R2 is smaller than the distance from the top end to the bottom end of the first range R1. When the movable part 100 is located within the control range R2, the pressure assembly 400 does not apply the first pre-pressure F1 to the movable part 100, and the pressure assembly 400 does not contact the movable part 100.

When the movable part 100 is located in any position within the first range R1, in a direction of the thickness of the pressure assembly 400 (Z-axis direction), the corresponding part of the movable part 430 is separated from the corresponding part of the fixed part 440 by a second distance d2. The first distance d1 (see FIG. 3) is greater than the second distance d2. When the movable part 100 moves within the control range R2, the distance d2 between the corresponding part of the movable part 430 and the corresponding part of the fixed part 440 does not change in the direction of the thickness of the pressure assembly 400.

Please refer to FIG. 6, which is a schematic diagram of the heights of the first range R1, the control range R2, the limit range R3, and the middle range R4 of the limit range R3 of the optical element driving mechanism 1 in a direction of the Z-axis, according to certain aspects of the present disclosure.

In this example, the first range R1 is within the limit range R3, that is, the limit range R3 includes the first range R1. The top end of the first range R1 is the same as the top end of the limit range R3, and the height of the bottom end of the first range R1 is greater than the height of the bottom end of the limit range R3. The distance from the top end to the bottom end of the first range R1 is smaller than the distance from the top end to the bottom end of the limit range R3. The control range R2 is within the first range R1, that is, the first range R1 includes the control range R2. The central value C3 of the limit range R3 is the average value of the top end of the limit range R3 and the bottom end of the limit range R3. In this example, the average value is an average value of distances, but in other embodiments, the average value may be an average value of angles, etc. The central value C1 of the first range R1 is an average value of the top end of the first range R1 and the bottom end of the first range R1. The central value C3 of the limit range R3 is different from the central value C1 of the first range R1. The central value C1 of the first range R1 is greater than the central value C3 of the limit range R3. A central value C2 of the control range R2 is an average value of the top end of the control range R2 and the bottom end of the control range R2. The center value C2 of the control range R2 is different from the center value C3 of the limit range R3. The central value C2 of the control range R2 is greater than the central value C1 of the first range R1. The middle range R4 of the limit range R3 is the section at the middle of the seven sections into which the limit range R3 is equally divided. The central value C1 of the first range R1 and the central value C2 of the control range R2 are not located within the middle range R4.

Please refer to FIG. 7, which is a cross-sectional view of another optical element driving mechanism 2 according to another aspect of the present disclosure. For illustrative purposes, the moving part of the optical element driving mechanism 2 is not shown. The optical element driving mechanism 2 has substantially the same structure as the optical element driving mechanism 1, and similar elements have the same reference numbers. The difference between the optical element driving mechanism 2 and the optical element driving mechanism 1 is the size of the magnetic element, and the optical element driving mechanism 2 has no external assembly. The size of the magnetic element 310' of the optical element driving mechanism 2 is larger than that of the magnetic element 310 of the optical element driving mechanism 1. The size of the magnetic elements 310' are larger than the size of the coils 320 and the length of the magnetic element 310' is roughly similar to the height of the bottom 220. The optical element driving mechanism 2 includes a movable part, a fixed part 200, a driving assembly 300', a pressure assembly 400, and a control assembly, the movable part may accommodate an optical element, and the driving assembly 300' drives the movable part to move relative to the fixed part 200.

The driving assembly 300' includes four magnetic elements 310', four coils 320, and two guiding elements 330. The magnetic element 310' and the guiding elements 330 are located on the bottom 220 of the fixed part 200. The coils 320 are located on the movable part. With the electromagnetic driving force generated between the magnetic elements 310' and the coils 320, the coils 320 move relative to the magnetic elements 310', driving the movable part to move in the Z-axis direction.

The pressure assembly 400 includes a corresponding part of the movable part 430, a corresponding part of the fixed part 440, and an elastic part 450 (see FIG. 8). The corresponding part of the movable part 430 is movably connected to the corresponding part of the fixed part 440 via the elastic part 450. The corresponding part of the fixed part 440 is fixedly connected to the bottom 220 of the fixed part 200. The corresponding part of the movable part 430 has a first surface 410 and a second surface 420. The first surface 410 is a surface of the corresponding part of the movable part 430 facing the movable part 100, and the second surface 420 is a surface of the corresponding part of the movable part 430 facing the bottom 220, that is, the first surface 410 and the second surface 420 are located on the corresponding part of the movable part 430.

By the electromagnetic driving force generated between the magnetic elements 310' and the coils 320 of the driving assembly 300', the coils 320 move relative to the magnetic elements 310' and drive the movable part to move relative to the fixed part 200 in the Z-axis direction, and the movement is guided by guiding elements 330. In the optical element driving mechanism 2 of this example, the movable part may be driven by the driving assembly 300' and move relative to the fixed part 200 within the first range R1. Since the length of the magnetic elements 310' is approximately similar to that of the bottom 220, the first range R1 of the movable part driven by the driving assembly 300 is approximately the same as the limit range R3. That is, since the magnetic elements 310' have a larger size than the coils 320, the movable part may be driven by the driving assembly 300' to move within a larger first range R1. Better optical imaging quality may be attained due to the larger range of motion. Therefore, the optical element driving mechanism 2 may deform the pressure assembly 400 and make the movable part reach the bottom end of the first range R1 without applying the second pre-pressure from the external assembly of the optical element driving mechanism 1.

Please refer to FIG. 8, which is a cross-sectional view of the optical element driving mechanism 2 when the movable part is in the initial position, according to some aspects of the present disclosure. When the movable part of the optical element driving mechanism 2 is located at the initial position of the bottom end of the first range R1, the movable part is in contact with the pressure assembly 400. When viewed along the direction perpendicular to the direction of the thickness of the pressure assembly 400, the corresponding part of the fixed part 440 at least partially overlaps with the movable part, and the corresponding part of the movable part 430 of the pressure assembly 400 directly contacts the fixed part 200. When the movable part 100 is in the initial position, the movable part directly contacts the first surface 410 of the pressure assembly 400. The second surface 420 of the pressure assembly 400 directly contacts the bottom 220 of the fixed part 200. When viewed along the direction of the thickness of the pressure assembly 400 (Z-axis direction), the first surface 410 and the second surface 420 at least partially overlap. The corresponding part of the movable part 430 directly contacts the movable part 100 and the bottom 220 of the fixed part 200. In the optical element driving mechanism 2 of this example, the corresponding part of the movable part 430 contacts the fixed part 200. However, in other exemplary optical element driving mechanisms, the corresponding part of the movable part does not contact the fixed part.

To sum up, the present disclosure provides an optical element driving mechanism, which saves space and achieves the purpose of miniaturization. At the same time, its structure may effectively absorb shocks, stabilize the internal structure, and provide more stable and better optical quality.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above-described embodiments. Rather, the scope of the disclosure should be defined in accordance with the following claims and their equivalents.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

What is claimed is:

1. An optical element driving mechanism, comprising:
a movable part connecting an optical element;
a fixed part, wherein the movable part moves relative to the fixed part;
a driving assembly, driving the movable part to move relative to the fixed part; and
a pressure assembly, used to exert a first pre-pressure onto the movable part, wherein the pressure assembly comprises:
a corresponding part of the movable part, corresponding to the movable part;
a corresponding part of the fixed part, corresponding to the fixed part; and
a control assembly, causing the movable part to move relative to the fixed part within a control range,
wherein in a direction of a thickness of the pressure assembly, when the movable part moves within the control range, a distance between the corresponding part of the movable part and the corresponding part of the fixed part does not change.

2. The optical element driving mechanism as claimed in claim 1, wherein the pressure assembly has a plate structure, and the pressure assembly further comprise:
an elastic part, wherein the corresponding part of the movable part is movably connected to the corresponding part of the fixed part via the elastic part.

3. The optical element driving mechanism as claimed in claim 1, wherein the corresponding part of the movable part comprises:
a first surface, which is a surface of the corresponding part of the movable part facing the movable part; and
a second surface, which is a surface of the corresponding part of the movable part facing the fixed part;
when viewed along the direction of the thickness of the pressure assembly, the first surface and the second surface at least partially overlap.

4. The optical element driving mechanism as claimed in claim 3, wherein:

the movable part moves within a limit range relative to the fixed part; and the limit range includes a first range, and the driving assembly drives the movable part to move relative to the fixed part within the first range.

5. The optical element driving mechanism as claimed in claim 4, wherein a central value of the limit range is different from a central value of the first range.

6. The optical element driving mechanism as claimed in claim 4, wherein:

the first range includes the control range; and when the movable part is located within the control range, the pressure assembly does not exert the first pre-pressure onto the movable part, and the pressure assembly does not contact the movable part.

7. The optical element driving mechanism as claimed in claim 4, wherein:

the central value of the control range is different from the central value of the limit range;

the limit range further includes a middle range, which is a section in the middle of seven sections into which the limit range is equally divided; and the central value of the control range and the central value of the first range are not located within the middle range.

8. The optical element driving mechanism as claimed in claim 4, wherein the driving assembly comprises a magnetic element and a coil, and the magnetic element and the coil have approximately the same size, the driving assembly drives the movable part to move relative to the fixed part in a first range.

9. The optical element driving mechanism as claimed in claim 8, wherein when the movable part is located at the bottom end of the first range, the movable part is in contact with the pressure assembly, the movable part directly contacts the first surface;

the corresponding part of the movable part is on the same plane as the corresponding part of the fixed part; and the corresponding part of the movable part does not contact the fixed part.

10. The optical element driving mechanism as claimed in claim 3, wherein the driving assembly comprises a magnetic element and a coil, and the size of the magnetic element is larger than the coil, the driving assembly drives the movable part to move relative to the fixed part in a first range.

11. The optical element driving mechanism as claimed in claim 10, wherein when the movable part is located at the bottom end of the first range, and the movable part is in contact with the pressure assembly, the movable part directly contacts the first surface.

12. The optical element driving mechanism as claimed in claim 11, wherein when the movable part is located at the bottom end of the first range, when viewed along a direction perpendicular to the direction of the thickness of the pressure assembly, the corresponding part of the fixed part at least partially overlaps the movable part; and the corresponding part of the movable part directly contacts the fixed part, and the second surface directly contacts the fixed part.

13. The optical element driving mechanism as claimed in claim 11, wherein when the movable part is located at the bottom end of the first range, when viewed along a direction perpendicular to the direction of the thickness of the pressure assembly, the corresponding part of the fixed part at least partially overlaps the movable part; and the corresponding part of the movable part does not contact the fixed part.

14. The optical element driving mechanism as claimed in claim 3, wherein the movable part corresponds to an external assembly, and the external assembly exerts a second pre-pressure onto the movable part, the second pre-pressure puts the movable part to the bottom end of a first range.

15. The optical element driving mechanism as claimed in claim 14, wherein the first pre-pressure and the second pre-pressure are in different directions.

16. The optical element driving mechanism as claimed in claim 14, wherein when the movable part is located at the bottom end of the first range, the movable part is in contact with the pressure assembly.

17. The optical element driving mechanism as claimed in claim 14, wherein when the movable part is located at the bottom end of the first range, the corresponding part of the fixed part at least partially overlaps the movable part when viewed along a direction perpendicular to the direction of the thickness of the pressure assembly; and the corresponding part of the movable part does not contact the fixed part.

18. The optical element driving mechanism as claimed in claim 14, wherein when the movable part is located at the bottom end of the first range, the corresponding part of the fixed part at least partially overlaps the movable part when viewed along a direction perpendicular to the direction of the thickness of the pressure assembly; and the corresponding part of the movable part directly contacts the fixed part.

* * * * *